United States Patent [19]
Bensel, III et al.

[11] Patent Number: 5,155,303
[45] Date of Patent: Oct. 13, 1992

[54] CABLE CLOSURE INCLUDING GROMMET HAVING ENHANCED SEALING CAPABILITY

[75] Inventors: William H. Bensel, III, Lawrenceville; Dean R. Frey, Dunwoody; John F. Malluck, Marietta; Neil W. Sollenberger, Norcross, all of Ga.

[73] Assignee: AT&T Bell Laboratories, Murray Hill, N.J.

[21] Appl. No.: 702,257

[22] Filed: May 17, 1991

[51] Int. Cl.$^5$ ............................................. H02G 15/08
[52] U.S. Cl. ................................. 174/93; 174/77 R; 174/92
[58] Field of Search ............... 174/92, 93, 77 R, 65 G

[56] References Cited

U.S. PATENT DOCUMENTS

| | | | |
|---|---|---|---|
| 3,705,950 | 12/1972 | Jirka et al. | 174/138 F |
| 3,848,074 | 11/1974 | Channell | 174/77 R X |
| 4,002,818 | 1/1977 | Kunze | 174/77 R X |
| 4,361,721 | 11/1982 | Massey | 174/92 |
| 4,558,174 | 12/1985 | Massey | 174/92 |
| 4,822,954 | 4/1989 | Rebers et al. | 174/93 |
| 4,839,471 | 6/1989 | Clark et al. | 174/93 X |
| 4,883,919 | 11/1989 | Abele | 174/93 |
| 4,927,227 | 5/1990 | Bensel, III et al. | 350/96.2 |
| 5,003,130 | 3/1991 | Danforth et al. | 174/153 G |
| 5,007,701 | 4/1991 | Roberts | 174/93 X |

*Primary Examiner*—Morris H. Nimmo
*Attorney, Agent, or Firm*—Edward W. Somers

[57] ABSTRACT

A closure (20) includes a grommet (50) having passageways (52-52) therethrough for allowing cables to extend into the closure. The grommet (50) comprises a unitary elastomeric body (60). Each passageway is defined by an interior sidewall from which a plurality of longitudinally spaced circumferential ridges (74-74) extend. For a substantial portion its circumference, each ridge has an axis of projection which forms an oblique angle with respect to a longitudinal axis of the associated passageway and is sufficiently elongated in longitudinal cross section so as to be capable of flexing with respect to the axis of projection during insertion of a portion of a cable and enlarging its opening diameter to accommodate and form a seal about the inserted cable portion. A slit (71) which is parallel to a longitudinal axis (73) of an associated passageway extends between end faces (62,64) and from the associated passageway to an outer surface portion of the grommet to facilitate insertion of a portion of a cable into the associated passageway. The grommet also includes a plurality of ribs (69,69) on an outer surface portion which provides a seal with a surface of an opening in which the grommet is disposed. Provisions are made to cause portions of each ridge and rib adjacent to each slit to be maintained with at least some overlap during installation and use of the closure in order to maintain the sealing effectiveness of the grommet.

26 Claims, 6 Drawing Sheets

CABLE CLOSURE INCLUDING GROMMET HAVING ENHANCED SEALING CAPABILITY

TECHNICAL FIELD

This invention relates to a cable closure which includes at least one grommet having enhanced sealing capability. More particularly, this invention relates to a cable closure having grommets through which extend cables, the grommets having enhanced capability to seal the closure against the ingress of moisture notwithstanding the application of forces to the cables and/or to the grommets.

BACKGROUND OF THE INVENTION

Where two ends of a cable such as a telecommunications cable are spliced together, the splice area is ordinarily housed within a protective cover known as a closure. Common to substantially all closures is the requirement that they restrict moisture ingress. The integrity of seals which are used to restrict moisture ingress is important especially because of transmission parameters which are readily effected by changes in the moisture content within the cable.

Such closures often have included cylindrical covers with one or more longitudinal joints and end plates that surround incoming and outgoing cables and that form seals with the covers. An example of a prior art closure is shown in U.S. Pat. No. 4,927,227 which issued on May 22, 1990 in the names of W. H. Bensel, III, et al.

To prevent the ingress of moisture, some systems employ dry air, nitrogen or a similar chemically inert gas in the cables and closures. In this type of closure, the gas is pressurized to create a flow from enclosed equipment through any openings and prevent the ingress of moisture. In such a system, it is advantageous to minimize the amount of gas leakage to reduce the consumption of gas needed to maintain adequate pressure throughout the system. Accordingly, closures and associated equipment should be sealed adequately to prevent a reduction in pressure and the loss of gas. Also, cable closures must be sealed to prevent the ingress of moisture.

In U.S. Pat. No. 4,361,721 which issued on Nov. 20, 1982 in the name of John R. Massey, there is disclosed a grommet which is used in splice cases to provide a seal about an entering or exiting cable. The grommet comprises a unitary elastomeric body having a slit along a split line to allow a cable to be inserted into a cable receiving passageway within the grommet. Each passageway is defined by an interior sidewall from which a plurality of longitudinally spaced circumferential ridges extend. For a substantial portion of its circumference, each ridge has an axis of projection which forms an oblique angle with respect to an axis of the passageway and is sufficiently elongated in longitudinal cross section so as to be capable of flexing with respect to the axis of projection during cable insertion and enlarging its opening diameter to accommodate and form a radial seal about a cable being inserted.

Despite such provision as the aforementioned grommet, moisture continues to be observed within closures. Because of the slit in the grommet which allows access to the opening therethrough to facilitate insertion of a cable, portions of the grommet on each side of the slit may become offset from each other as a result of forces being applied to the cable or to the closure. With those portions offset from each other, the portions of the ridges which define the cable opening and which are adjacent to the slit become offset, forming a path therebetween along which gas and/or moisture may travel.

Offset may come about in another way. In some closures, the end plate may be formed to include two portions which are separated along lines which extend through the cable openings. Prior to assembly of the end plate portions, grommets are disposed in the openings in one portion and then the other portion assembled thereto. However, there are some closures in which the end plate is unipartite in which case the grommet or grommets are forced into the opening or openings in the end plate. When this is done, portions of each grommet adjacent to its split line may become offset from each other.

What is needed and what seemingly is not available in the prior art is a cable closure which includes a grommet that maintains its sealing capability notwithstanding the application of forces thereto. The sought after grommet should be relatively easy to manufacture and should continue to provide a seal about a cable extending therethrough despite the application of forces which tend to offset portions of the grommet adjacent to the split line.

SUMMARY OF THE INVENTION

The foregoing problems of the prior art have been overcome with the closure of this invention which includes a grommet having enhanced sealing capability. A closure includes support means which includes at least one end plate and a cover. The end plate includes at least one opening through which a cable is adapted to extend. The support means is adapted to hold at least one connection arrangement between two transmission media, and the cover is adapted to be assembled to the support means and to cooperate with the end plate to enclose the at least one connection arrangement.

In order to prevent the ingress of moisture, a sealing grommet is disposed in the at least one opening and comprises a unipartite body comprising inner and outer end faces which are spaced apart. The body also includes at least one passageway which extends between the end faces. A plurality of longitudinally spaced, peripheral means extend from the body and are adapted to engage a surface juxtaposed to the grommet to provide a seal between the grommet and the surface. Each passageway has associated therewith a slit extending in a direction parallel to the longitudinal axis of the passageway between an outer surface of the body and the passageway and extending transversely across the plurality of peripheral means to facilitate movement of a portion of a cable into the passageway. The grommet includes provisions for causing at least a portion of each peripheral means which face each other across the slit to remain overlapped notwithstanding the application of forces to portions of the body adjacent to each slit.

In a preferred embodiment, the body has ribs on an outer periphery which are adapted to mate with the periphery of an opening of the end plate in which the grommet is disposed. At least one cable-receiving passageway extends through the body from the inner end face to the outer end face, the passageway being defined by an interior sidewall having a diameter which is larger than that of any cable a portion of which is expected to extend through the passageway. The grommet includes a plurality of longitudinally spaced circumferential ridges associated with each passageway with each ridge extending inwardly from the interior wall and defining an opening having a diameter which is normally smaller than that of any cable a portion of which is expected to be inserted. For at least a substantial portion of its circumference, each ridge has an axis of projection which forms an oblique angle with respect to the axis of the passageway and is sufficiently elongated in longitudinal cross section so as to be capable of flexing with respect to the axis of projection to allow each ridge to flex along the substantial portion to accommodate a cable portion in an expected range and form a seal about the cable portion.

Further, associated with each passageway and extending therefrom to an outer surface of the body is a slit which is parallel to a longitudinal axis of the passageway. In a preferred embodiment, each ridge in a slitted passageway varies in projecting length to become stub-like in the vicinity of the slit and substantially incapable of flexing. In order to maintain an effective seal when forces are applied to the grommet and cause offset of facing portions of each ridge adjacent to the slit line, the portions of the ridges within the passageways which are adjacent to the slit line have an enlarged width as measured in a direction parallel to the longitudinal axes of the passageways. Further, ribs which may be formed on the exterior of the body have portions thereof adjacent to the slit line widened in order to provide a seal with a wall of an opening in the end plate in which the grommet is disposed.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
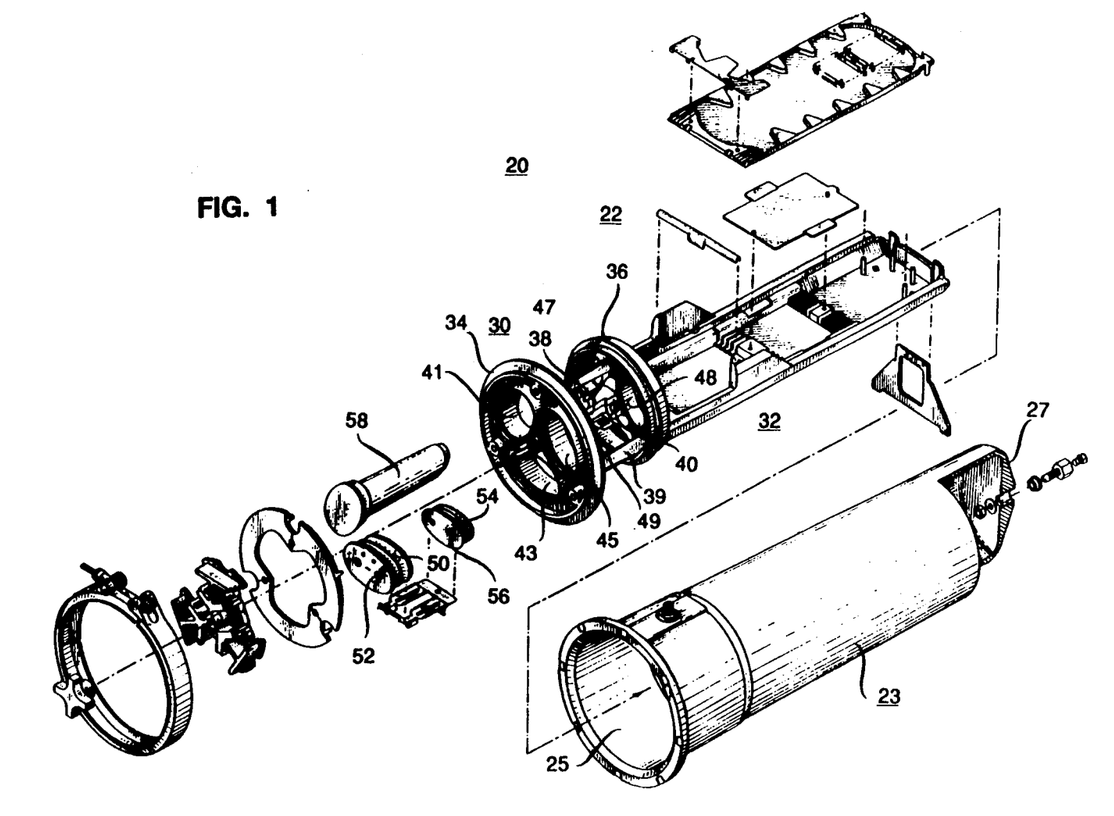
FIG. 1 is a perspective view of a closure of this invention which includes at least one grommet having enhanced sealing capability.

Referring now to FIG. 1, there is shown a closure which is designated generally by the numeral 20, and a cable splice support assembly 22 in which optical fibers (not shown), for example, are spliced and/or stored and a cover 23. The cover 23 is cylindrically shaped and includes an open end 25 and a closed end 27. In order to assemble cable splicework, the cable splice support assembly 22 is inserted into the open end 25 of the cover and moved toward the closed end. Whereas the following description describes the splicing of two cables 28 and 29 (see FIG. 2), it should be appreciated that the closure 20 can accommodate additional cables to be spliced or can be used to store optical fibers for future splicing to branch cables.

As also can be seen in FIG. 1, the cable splicing support assembly 22 includes a cable entry portion 30 and optical splice support means 32. The cable entry portion 30 may include two spaced end plates 34 and 36, each of which is disc-shaped with the end plate 34 being referred to as an outer end plate and the end plate 36 being referred to as an inner end plate. Each of the end plates 34 and 36 is made preferably of a molded plastic, glass-reinforced polypropylene. The two end plates 34 and 36 are held in assembled relationship spaced apart by a central stud 38 and three circumferentially disposed standoffs 39—39 which are molded integrally with the inner end plate 36. Disposed between the end plates are bonding facilities, designated generally by the numeral 40, which are used to ground portions of the cables.

Each of the end plates is also provided with oval shaped openings. In the embodiment shown in FIG. 1, three openings are provided with those in the outer end plate 34 being designated 41, 43 and 45 and with those in the inner end plate 36 being designated 47, 48 and 49. Openings in the end plate 34 are aligned with associated ones of the openings in the end plate 36. The opening 41 is aligned with the opening 47, 45 and 48 and 43 with 49.

Figure 2:
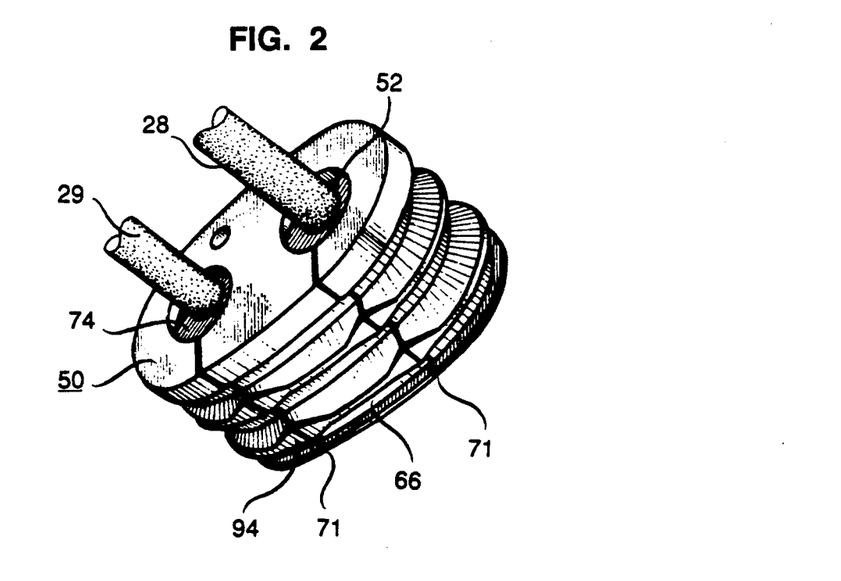
FIG. 2 is a perspective view of a grommet which is included in the closure of FIG. 1.
Figure 3:
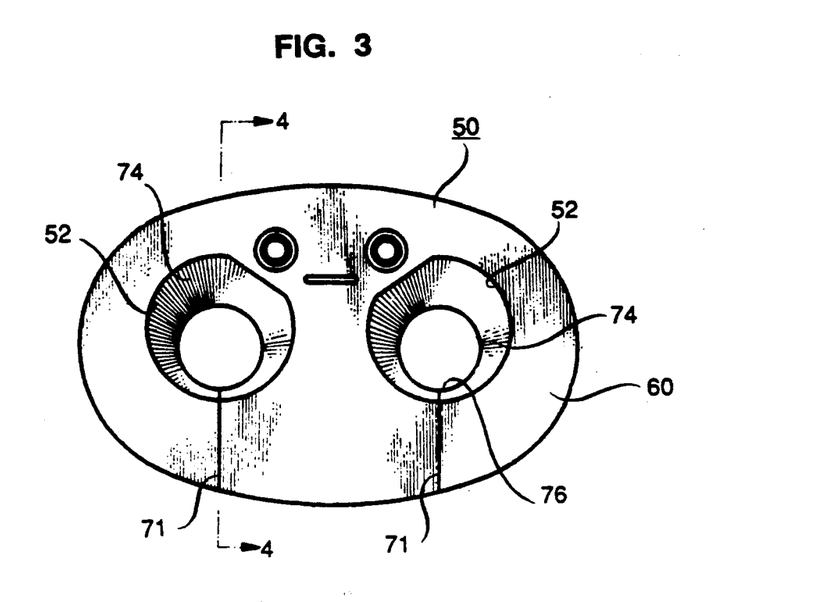
FIG. 3 is an end view of the grommet of FIG. 2.

Disposed in the opening 43 is a grommet 50 (see FIGS. 1, 2, and 3). The grommet 50 shown in the drawing includes two passageways 52—52 through which are destined to extend the cables 28 and 29 to be spliced. Similarly, a grommet 54 which is aligned with the grommet 50 and which includes two passageways 56—56 is disposed in the opening 49. Two cables to be spliced are destined to extend through the passageways 52—52 and 56—56 of the aligned grommets 50 and 54. Each of the openings 47, 48 and 49 of the inner end plate 36 has a rim thereabout on the inner side of the inner end plate. In this way, the grommets in the inner end plate are prevented from moving through the inner end plate.

Unless it known from the outset that more than two cables are to be spliced in the closure 20, the other two sets of aligned openings in the end plates are provided with dummy plugs 58—58. Advantageously, as more cable needs to be spliced in the closure 20, one or both of the dummy plugs is removed and replaced with a pair or pairs of grommets identical to the grommets 50 and 54. Other features of the closure are shown, for example, in previously mentioned U.S. Pat. No. 4,927,227, which is incorporated hereinto.

The sealing grommet 50 (see FIGS. 3, 4 and 5), which includes a unitary body 60 preferably is molded from an elastomeric material such as urethane rubber, for example, includes an inner end face 62, and outer end face 64, and a substantially longitudinally-extending outer surface portion 66. Adjacent to the end face 62 is provided a radial shoulder 68. Extending from the outer surface portion 66 are a plurality of annular ribs 69—69 having grooves 67—67 therebetween. The ribs 69—69 of each grommet are designed to seat in an opening of and to form a seal with a wall of the end plate which defines an opening in which the grommet is disposed.

For use with a unitary end plate, forces are applied to the grommet 50 to cause it to become disposed in the opening 43 (see FIG. 1). As the grommet 50 becomes disposed in the opening 43 with the end face 64 aligned with an outer surface of the end plate, the shoulder 68 which was compressed during insertion returns to its configuration shown in FIG. 4 and seats against an inner surface of the outer end plate 34. To help ensure an effective seal, sealing compound also may be applied to the ribs 69—69 so that voids between the ribs and annular grooves therebetween are filled.

As mentioned hereinbefore, each grommet 50 is provided with one or more passageways 52—52. As seen in FIGS. 2 and 3, each passageway 52 has associated therewith a longitudinally-extending slit 71 in the grommet body which extends radially from the passageway to the outer surface portion 66 to provide access for sliding a portion of each cable 28, 29 into a passageway 52. Each slit 71 is associated with and extends parallel to a longitudinal axis 73 (see FIG. 4) of an associated passageway which extends through each grommet. Further, each slit 71 allows adjacent portions of the body of the grommet which are adjacent to and define the slit to be moved apart to expose the passageway. This allows a craftsperson to move the grommet over a portion of a cable. A cable is inserted by separating the portions which define a passageway 52 at the split line and pushing the cable transversely into the passageway 52. Afterwards, the craftsperson releases the grommet portions so that they can return to their unmoved positions to complete the encirclement of the cable portion.

Referring again to FIGS. 2, 3 and 4, it can be seen that each slitted passageway 52 is defined by a cylindrical interior sidewall 72 having a nominal diameter $D_{SW}$ which is larger than the diameter of any cable expected to be inserted. Also, the passageway is defined by a plurality of longitudinally spaced circumferential ridges 74—74 defining substantially circular openings 76—76 each normally having a diameter $D_{SR}$ which is smaller than the expected diameter of any cable 28, 29 to be inserted.

For a substantial portion of its circumference, each ridge 74 is angularly disposed toward the inner grommet face 62 (see FIG. 4) and has a longitudinal cross section having an axis of projection 82 which forms an oblique angle $\beta$ with respect to the axis 73 of the associated passageway 52. In the preferred embodiment, the axis 73 of the passageway 52 is also of the interior sidewall 72. Each ridge 74 also is sufficiently elongated for a substantial portion of its periphery so as to be capable of flexing with respect to its axis of projection 82 along the substantial portion. Further, an end portion 83 of each ridge 74 in longitudinal cross section is rounded.

In order to engage sealingly a cable, each ridge 74 varies in projected length from the interior sidewall 72 along its circumference. The change in projected length along the circumference is gradual for each ridge 74. Also, each ridge 74 forms a stub-like portion 86 (see FIG. 4) in the vicinity of the slit 71 which is substantially inflexible. In the preferred embodiment, each ridge 74 in the slitted passageway 52 is elongated and flexible for at least 270 degrees of its circumference.

Figure 4:
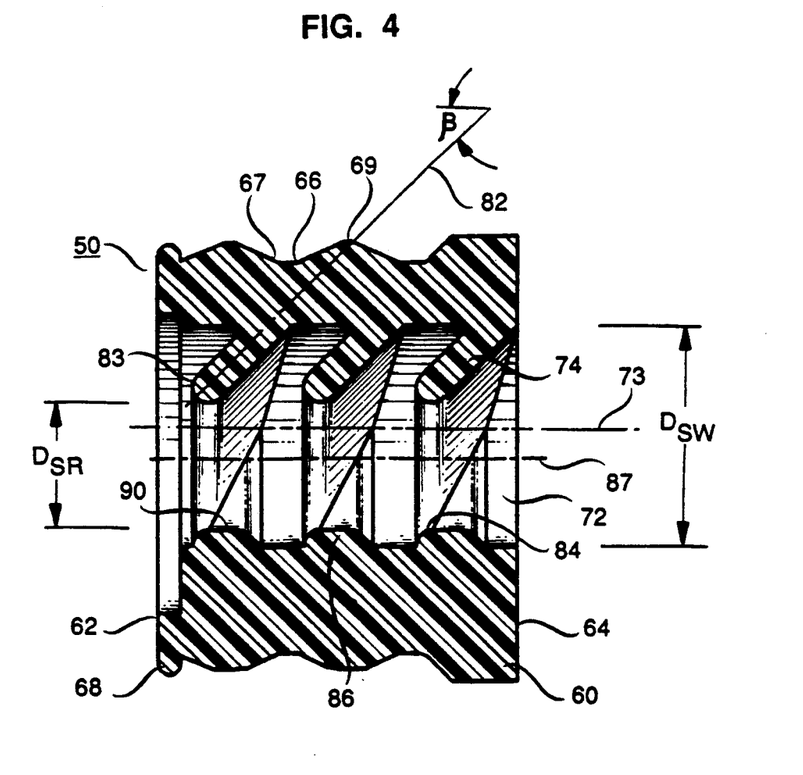
FIG. 4 is a side elevational view in section of the grommet of FIG. 3 taken along lines 4—4 thereof.

For the substantial portion where each ridge 74 is sufficiently elongated to flex about its axis of projection 82, the ridge 74 is capable of flexing as needed to enlarge its opening 76 during cable insertion. However, in the vicinity of the slit 71, each ridge 74 is substantially incapable of flexing and can deform only slightly under compression in the radial direction.

Figure 6:
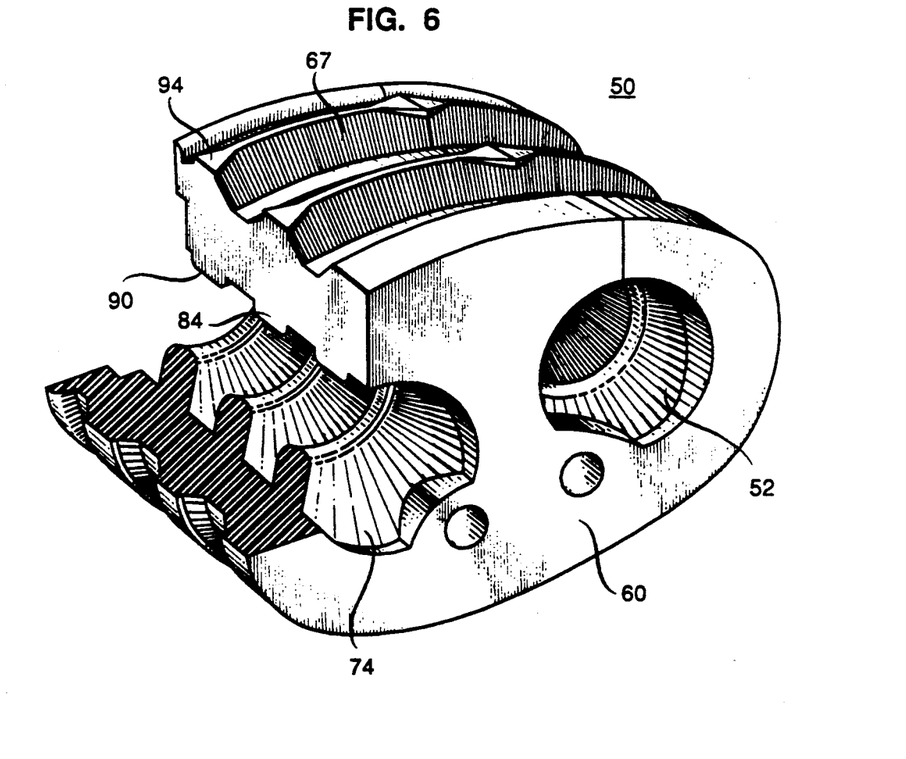
FIG. 6 is a perspective view of the grommet of FIG. 2 broken away to show a perspective view of a passageway.

The inflexibility of each ridge 74 in the vicinity of the slit 71 ensures substantial overlap and hence longitudinal alignment of edge portions 84—84 (see also FIG. 6) on each ridge 74 at the slit 71 when the slit closes after insertion of a portion of a cable into the associated passageway. This helps to ensure substantial circumferential surface continuity in each ridge 74 for achieving an effective radial seal about an inserted cable portion.

In the passageway 52 in the illustrative embodiment, the slit 71 is longitudinally extending and the ridges 74—74 are longitudinally aligned with one another so that an imaginary straight line 87 substantially contains the centers of the openings 76. This imaginary line 87 is offset radially though parallel with respect to the axis 73 of the passageway 52. Hence, only one ridge 74 can be seen in FIG. 3. As is representative of the other ridges 74—74, the ridge shown in FIG. 3 is most elongated along its circumference at a point diametrically opposite to the slit 71 in the passageway 52 and most shortened or stub-like at the slit 71.

It is apparent that the slit 71 can actually extend diagonally into a passageway rather than as is shown, in which case the centers of the openings 76—76 still would be contained in an imaginary curved line, still not coincident with the axis 73.

During installation of a grommet 50 having slitted passageways 52—52, sealing compound may be applied along the longitudinal slits 71—71 before insertion of the cables 28, 29 to ensure an effective moisture tight seal along the slits. When the grommet 50 is inserted into an opening in the unitary end plate, the grommet is compressed radially inward supplying forces on the grommet 50 to help ensure that the slits 71—71 close completely. A sealing compound also may be applied to the ridges 74—74 to ease cable insertion.

Figure 7:
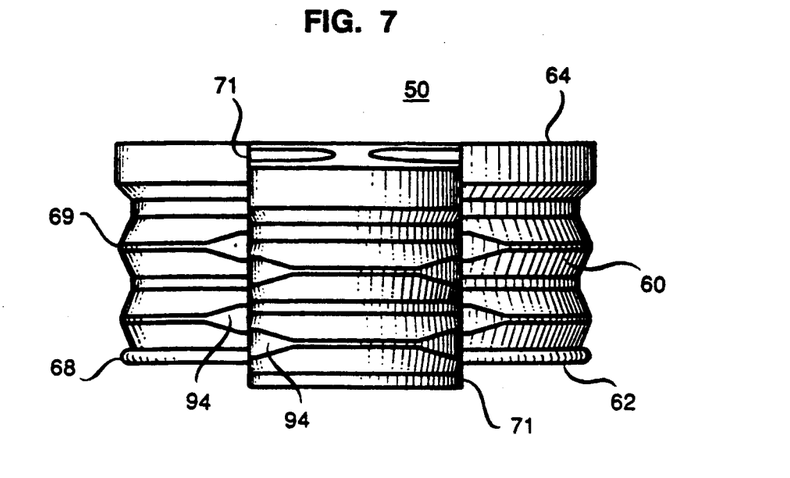
FIG. 7 is a plan view of the grommet of FIG. 3 after offset of portions thereof has been caused by the application of forces to the grommet.

During installation and during use of the closure, forces are caused to be applied to the grommet which, undesirably, cause portions of the body 60 adjacent to each slit 71 to shift relative to each other as shown in FIG. 7. This causes an offset between a portion of a ridge 74 and a rib 69 on one side of the slit from a previously aligned opposing portion of the same ridge and rib on the other side of the slit. Each ridge and rib for purposes of sealing in engagement with a cable portion need not be very wide. However, if the ridge is provided with a width sufficient only to resist flexing, the opposing portions at a slit line may become so offset that a path for moisture is established.

In order to overcome this, the grommet 50 includes provisions for causing at least portions of opposing ridge and rib portions adjacent to a slit 71 to overlap notwithstanding the application of forces which tend to cause offset of body portions of the grommet. This is accomplished as shown in the preferred embodiment by increasing the width of each ridge 74 (see FIGS. 4 and 6) and ribs (see FIGS. 2, 4, 5, 6 and 7) as measured in a direction parallel to the axis 73. As is seen in the drawing, each ridge 74 has a portion 90 adjacent to a slit 71 which is substantially more wide than throughout the remainder of its periphery. As a result, when offset in portions adjacent to a slit 71 occurs such as is shown in FIG. 7, there is sufficient width so that at least portions of each ridge 74 which face each other across the slit 71 remain overlapped.

Figure 5:
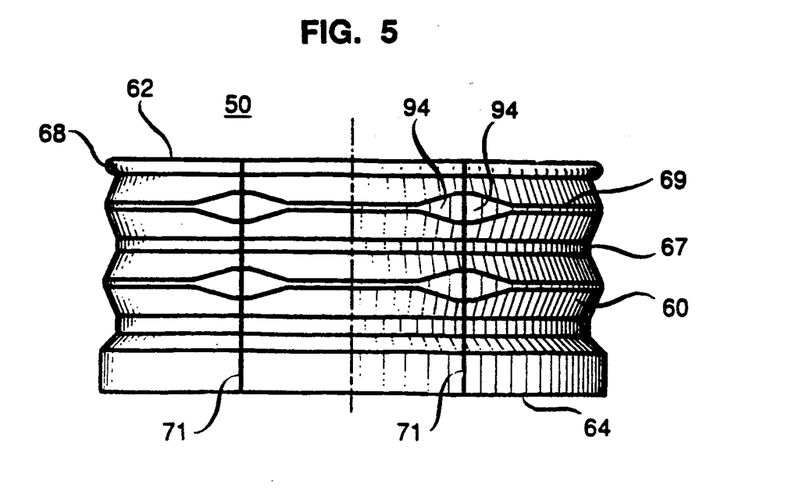
FIG. 5 is a plan view of the grommet of FIG. 3.

The ribs 69—69 on the outer surface of the grommet are provided with a similar structure. As is seen in FIG. 5, for example, each rib 69 adjacent to a slit 71 has a portion 94 which is increased in width over the width of other portions which are not adjacent to a slit. Again, as with the ridges 74—74, at least some overlap of the opposing portions 94—94 will be preserved notwithstanding any offset from expected forces (see FIG. 7).

In another embodiment of this invention, a cable closure 100 (see FIG. 8) includes a splicing termination assembly 102 in which fibers are spliced and/or stored and a cover 104. The cover is cylindrically shaped and includes an open end 106 and a closed end 108. An axis 112 of the closure extends from the open end 106 of the cover to the closed end 108. In order to assemble the cable splicing termination assembly 102 with the cover 104, the cable splicing termination assembly is inserted into the open end 106 of the cover and moved toward the closed end.

Figures 8, 9:
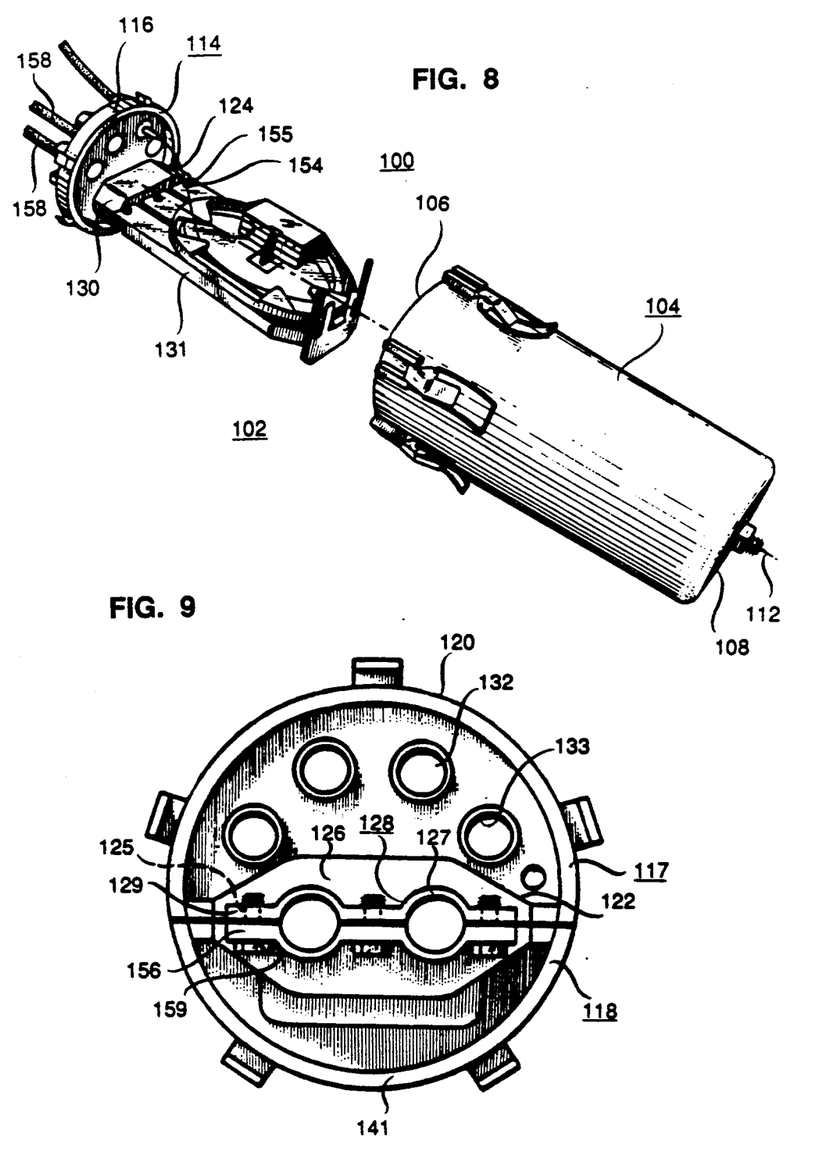
FIG. 8 is a perspective view of another closure.
FIG. 9 is an end view of the closure of FIG. 8.

As also can be seen in FIG. 8, the cable splicing termination assembly 102 includes a cable entry portion 114. The cable entry portion 114 includes an end plate assembly 116 a portion of which is disc-shaped. The end plate assembly 116 preferably is made of a molded, glass-reinforced plastic material.

Each end plate assembly 116 includes two portions 117 and 118 (see FIG. 9). The portion 117 includes a partially circular flange 120, an outwardly projecting portion 122 and an inwardly projecting portion 124 (see also FIGS. 8 and 10). The outwardly projecting portion 122 includes a housing portion 126 having an extension which is designated generally by the numeral 128. The extension 128 includes two semi-circular conduits 127—127 which are disposed between landings 129—129 of the extension. Each of the landings 129—129 is provided with a threaded opening 125. As can be seen in FIG. 8, the inwardly extending portion 124 includes a housing portion 130 from which extends a landing portion 131 comprising spaced ears. Also included in the portion 117 are four openings 132—132 (see FIG. 9), from each of which on an external side of the end plate assembly 116 extends an externally threaded nipple 133. Each of the openings 132—132 is adapted to allow a predetermined drop cable to extend therethrough.

As mentioned earlier, the end plate assembly 116 also includes a portion 118. The portion 118 includes an arcuately shaped flange 141 (see FIGS. 9 and 10) having inner and outer portions 143 and 145, respectively, projecting therefrom. The inner portion 143 includes a housing portion 147 which includes a post 148 disposed therein and from which a threaded stud 149 extends upwardly.

Also, the inner portion 143 includes three spaced ears 151—151 projecting inwardly longitudinally of the closure. Each ear 151 includes an opening 153 therein. When the portion 118 is assembled to the portion 117 to complete the circular flange to which is to be secured the cover, the openings 153—153 are aligned with threaded openings 155—155 (see FIG. 8) which are formed in the ears of the landing 131. Bolts 154—154 are inserted through openings in the cable splice support assembly 102 and through the openings 153—153 and turned into the threaded openings 155—155 of the ears to secure the cable splice support assembly to the end plate assembly 116. The outer portion 145 (see FIG. 10) includes three spaced ears 156—156 each having an aperture 157 therein. Disposed between each two ears 156—156 is an arcuately formed surface 159 which when the portions 117 and 118 are assembled together cooperates with an arcuately shaped surface of the outwardly projecting portion of the upper portion 117 to provide a conduit for distribution cables 158—158 (see FIG. 8) to be spliced. Also, when the portions 117 and 118 are assembled together, the apertures 157—157 of the outer portion of the portion 118 become aligned with the threaded openings in the outwardly projecting portion of the portion 117 so that bolts may be used to secure together the two outwardly extending portions.

A gasket 160 (see FIG. 10) is disposed between the portions 117 and 118 of the end plate assembly to provide a seal between those two portions when assembled together and about the distribution cables which extend into the end plate assembly and about cable cores which extend out of the cable end plate assembly and farther into the closure. Different gaskets may be used to accommodate different cable sizes through the portions of the gaskets which are disposed in engagement with the arcuately formed surfaces of the housing portions. Shim washers (not shown) may be disposed over the threaded stud 149, depending on the size of cables used, in order to keep the cable cores centered within the openings in the interior housing portions. Other portions of the closure 100 are disclosed in application Ser. No. 07/673,880 which was filed on Mar. 22, 1991 in the names of G. S. Cobb, et al.

Figure 10:
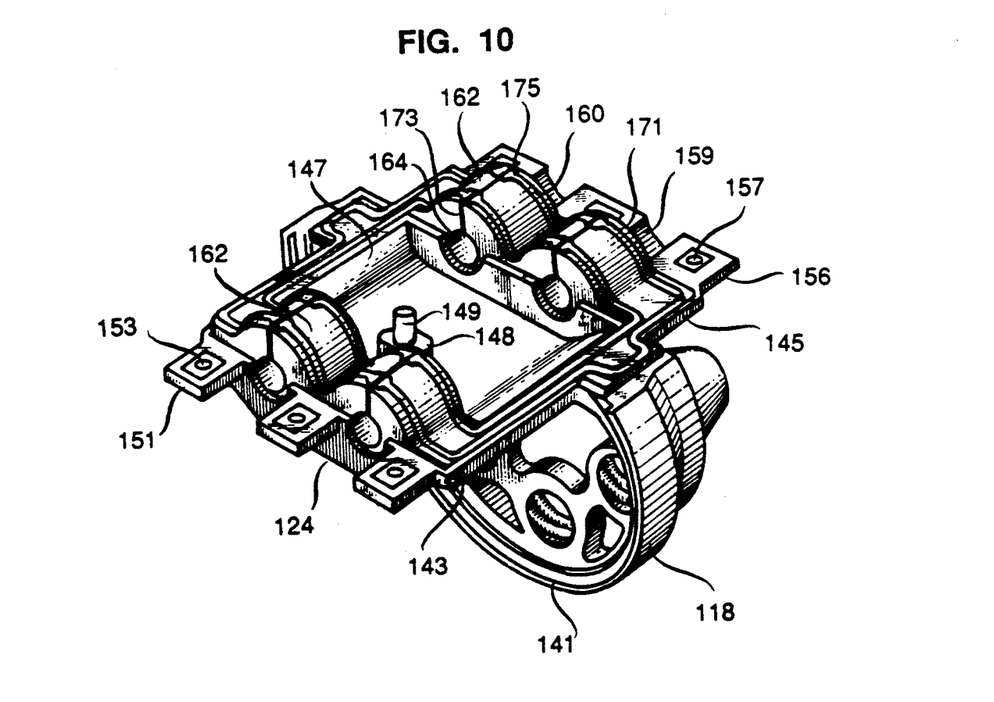
FIG. 10 is a perspective view of a portion of the closure of FIG. 8 to show a sealing arrangement between portions of the closure.

As can be seen in FIG. 10, the gasket 160 includes four grommets 162—162. Each of the grommets 162—162 is disposed in one of the conduits in the portions 122 and 124. Further each grommet includes a passageway 164 for receiving a portion of a cable.

In order to insure sealing contact between the wall of the end plate which defines each opening and each grommet 162, an outer portion of each grommet is provided with ribs 171—171. When a grommet is disposed in an end plate opening, the ribs 171—171 thereof engage the wall which defines the opening to establish sealing contact. Should offset occur in the grommet 162 between portions adjacent to a slit 173 along a split line, the opposing portions of each rib may be offset sufficiently to allow moisture or water to move therepast.

In order to overcome this problem, the width of portions of the ribs 171—171, as was done with the ribs 69—69, adjacent to each slit 173 is increased to provide portions 175—175 (see FIG. 10) adjoining each slit. The increase is such that for any expected offset, there will exist overlap between at least portions of the portions of the ribs adjacent the split lines.

Figure 11:
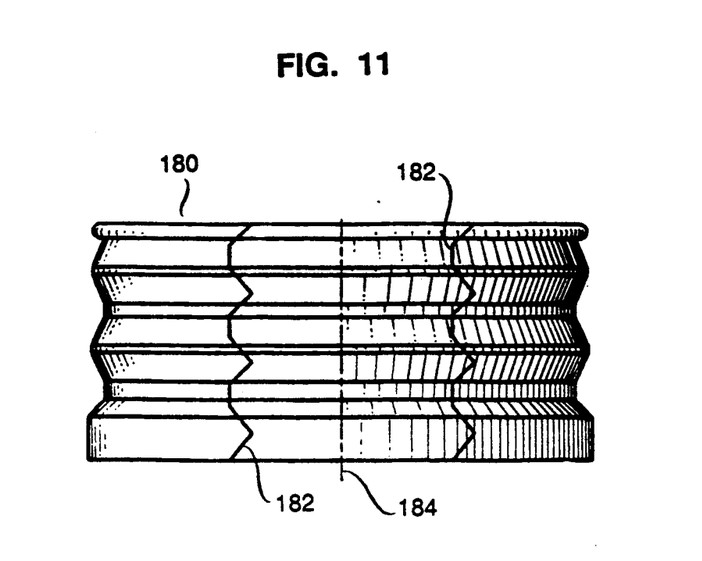
FIG. 11 is a plan view of an alternative embodiment of a grommet of this invention.

The foregoing problem of offset of portions of a grommet which define a slit extending to a cable receiving passageway also may be overcome by the embodiment of this invention which is shown in FIG. 11. As can be seen, a grommet 180 includes two slits 182—182. Each slit of the grommet 180 rather than a straight line parallel to a longitudinal axis of the cable is formed in a zigzag configuration comprising a plurality of segments. As a result, forces applied to the cable which extends through the grommet or to the grommet are not effective to offset in a direction parallel to a longitudinal axis 184 the portions of the grommet adjacent to the slit.

It is to be understood that the above-described arrangements are simply illustrative of the invention. Other arrangements may be devised by those skilled in the art which will embody the principles of the invention and fall within the spirit and scope thereof.

We claim:

1. A closure in which at least one transmission medium is connected to another transmission medium, said closure comprising:

support means including an end plate for holding at least one connection arrangement between two transmission media of cable, said end plate including at least one opening therethrough;

a cover which is adapted to be assembled to said support means and to cooperate with said end plate to enclose said at least one connection arrangement; and a sealing grommet which is disposed in said at least one opening and which comprises:

a unipartite body having inner and outer end faces which are spaced apart and having at least one cable receiving passageway which extends through said body from said inner end face to said outer end face, said at least one passageway being defined by an interior sidewall, having a diameter which is larger than that of a cable which includes transmission media and a portion of which is expected to extend through said at least one passageway and having a longitudinal axis extending between said inner and outer end faces; and a plurality of longitudinally spaced, peripheral means extending from said body and adapted to engage a surface juxtaposed to said grommet to provide a seal between said grommet and the surface, said at least one passageway having associated therewith a slit extending between said inner and outer end faces between an outer surface portion of said body and said at least one passageway and extending transversely across said plurality of peripheral means to facilitate movement of a portion of a cable into said at least one passageway;

said grommet including provisions for causing at least portions of each said peripheral means which face each other across a slit to remain overlapped notwithstanding the application of forces to at least a portion of said body adjacent to the slit.

2. The closure of claim 1, wherein said peripheral means includes a plurality of longitudinally spaced circumferential ridges associated with said at least one passageway, each ridge extending inwardly from said interior sidewall of said at least one passageway and defining an opening having a diameter which is normally smaller than that of a cable a portion of which is expected to be inserted into said at least one passageway, and which is sufficiently elongated in longitudinal cross section at least along a portion of its periphery so as to be capable of flexing with respect to an axis of projection to allow each ridge to flex along a substantial portion to accommodate a cable portion in an expected range of cable diameters and form a seal about the cable portion said at least one passageway having a slit associated therewith and extending between said end faces in a direction parallel to a longitudinal axis of said at least one passageway and between an outer surface of said body and said at least one passageway and said grommet including provisions for causing at least portions of each ridge which face each other across a slit to remain overlapped notwithstanding the application of forces which cause relative longitudinal motion of portions of said body on opposite sides of the slit to an extent which would compromise the sealing capability of said grommet.

3. The closure of claim 1, wherein said peripheral means includes a plurality of longitudinally spaced circumferential ribs formed on an outer surface portion of said grommet, each said rib providing a seal with a wall which defines said at least one opening in which said grommet is disposed.

4. The closure of claim 1, wherein said slit is formed in a plurality of segments interconnected in a zigzag path across said body of said grommet.

5. A closure in which at least one transmission medium is connected to another transmission medium, said closure comprising:

support means including an end plate for holding at least one connection arrangement between two transmission media of cable, said end plate including at least one opening therethrough;

a cover which is adapted to be assembled to said support means and to cooperate with said end plate to enclose said at least one connection arrangement; and a sealing grommet which is disposed in said at least one opening and which comprises:

a unipartite body having inner and outer end faces which are spaced apart and having at least two cable receiving passageways which extend through said body from said inner end face to said outer end face, each said passageway being defined by an interior sidewall having a diameter which is larger than that of a cable a portion of which is expected to extend through said each passageway and having a longitudinal axis extending between said inner and outer end faces; and a plurality of longitudinally spaced circumferential ridges associated with each said passageway, each ridge extending inwardly from said interior sidewall of the associated passageway and defining an opening having a diameter which is normally smaller than that of a cable a portion of which is expected to be inserted into said associated passageway, and which is sufficiently elongated in longitudinal cross section at least along a portion of its periphery so as to be capable of flexing with respect to an axis of projection to allow each ridge to flex along a substantial portion to accommodate a cable portion in an expected range of cable diameters and form a seal about the cable portion;

each said passageway having a slit associated therewith and extending between said inner and outer end faces between an outer surface portion of said body and said each passageway and said grommet including provisions for causing at least portions of each ridge which face each other across a slit to remain overlapped notwithstanding the application of forces which cause relative longitudinal motion of portions of said body on opposite sides of the slit to an extent which otherwise would compromise the sealing capability of said grommet.

6. The closure of claim 5, wherein said grommet includes provisions for causing the portions of said ridges across said slits to overlap in a direction parallel to the longitudinal axes of the passageways when said grommet is subjected to forces which cause portions of said grommet adjacent to each said slit to become offset with respect to each other, and wherein stub-like portions of each said ridge adjacent to each said slit have a width as measured in a direction parallel to the longitudinal axis of the associated passageway which is greater than that of the remaining portion of said each ridge and which is sufficient so that adjacent portions of the ridges on opposite sides of each slit have at least portions thereof which overlap for expected offsets.

7. The closure of claim 5, wherein each said slit is formed in a zigzag path across the body of the grommet, thereby causing portions of said ridges facing each other across each said slit to remain overlapped to provide a seal.

8. A closure in which at least one transmission medium is connected to another transmission medium, said closure comprising:

support means including an end plate for holding at least one connection arrangement between two transmission media of cable, said end plate including at least one opening therethrough;

a cover which is adapted to be assembled to said support means and to cooperate with said end plate to enclose said at least one connection arrangement; and a sealing grommet which is disposed in said at least one opening and which comprises:

a unipartite body having inner and outer end faces which are spaced apart and having at least two cable receiving passageways which extend through said body from said inner end face to said outer end face, each said passageway being defined by an interior sidewall having a diameter which is larger than that of a cable a portion of which is expected to extend through said each passageway and having a longitudinal axis extending between said inner and outer end faces; and a plurality of longitudinally spaced circumferential ridges associated with each said passageway, each ridge extending inwardly from said interior sidewall of the associated passageway and defining an opening having a diameter which is normally smaller than that of a cable a portion of which is expected to be inserted into said associated passageway, and where for a substantial portion of its circumference, each ridge has an axis of projection which forms an oblique angle with respect to the longitudinal axis of the associated passageway and is sufficiently elongated in longitudinal cross section so as to be capable of flexing with respect to the axis of projection to allow each ridge to flex along the substantial portion to accommodate a cable portion in an expected range of cable diameters and form a seal about the cable portion;

each said passageway having a slit associated therewith and extending between said end faces in a direction parallel to a longitudinal axis of said associated passageway and between an outer surface portion of said body and said each passageway and wherein each ridge in the slitted passageway varies in projecting length to become stub-like in the vicinity of the slit and substantially incapable of flexing, said grommet including provisions for causing at least portions of each ridge which face each other across a slit to remain overlapped notwithstanding the application of forces which cause relative longitudinal motion of portions of said body an opposite sides of the slit to an extent which would compromise the sealing capability of said grommet.

9. The closure of claim 8, wherein said grommet includes provisions for causing the portions of each said ridge across a slit to overlap in a direction parallel to the longitudinal axis of the associated passageway when said grommet is subjected to forces which cause portions of said body adjacent to each said slit to become offset with respect to each other.

10. The closure of claim 9, wherein said stub-like portions of said ridges adjacent to said slits have a width as measured in a direction parallel to the longitudinal axes of the passageways which is greater than that of the remaining portions of the ridges and which is sufficient so that adjacent portions of the ridges on opposite sides of each slit have at least portions thereof which overlap for expected offsets.

11. The closure of claim 10, wherein an outer portion of said grommet is provided with a plurality of outwardly projecting peripherally disposed ribs which engage a wall of the closure which defines an opening in which said grommet is disposed to provide a seal against the ingress of moisture.

12. The closure of claim 11, wherein said grommet includes provisions for causing the portions of said ribs across said slits to overlap in a direction parallel to the longitudinal axes of the passageways when said grommet is subjected to forces which cause portions of said grommet adjacent to said slits to become offset with respect to each other.

13. The closure of claim 12, wherein portions of each said rib adjacent to each said slit have a width as measured in a direction parallel to the longitudinal axes of the passageways which is greater than that of the remaining portions of the ribs and which is sufficient so that adjacent portions of the ribs on opposite sides of the slits have at least portions thereof which overlap for expected offsets.

14. A grommet which is capable of providing sealed engagement with a surface, said grommet comprising:

a unipartite body having inner and outer end faces which are spaced apart and having at least one passageway which extends through said body from said inner end face to said outer end face, each said passageway being defined by an interior sidewall, having a diameter which is larger than that of any elongated member a portion of which is expected to extend through said at least one passageway and having a longitudinal axis extending between said inner and outer end faces; and a plurality of longitudinally spaced, peripheral means extending from said body and adapted to engage a surface juxtaposed to said grommet to provide a seal between said grommet and the surface, said at least one passageway having associated therewith a slit extending in a direction parallel to the longitudinal axis of said each passageway between an outer surface portion of said body and said at least one passageway and extending transversely across said plurality of peripheral means to facilitate movement of a portion of an elongated member into said at least one passageway; and said grommet including provisions for causing at least a portion of each said peripheral means which face each other across a slit to remain overlapped notwithstanding the application of forces to at least a portion of said body adjacent to the slit.

15. The grommet of claim 14 wherein said peripheral means includes
- a plurality of longitudinally spaced circumferential ridges associated with said at least one passageway, each ridge extending inwardly from said interior sidewall of the said at least one passageway and defining an opening having a diameter which is normally smaller than that of a cable a portion of which is expected to be inserted into said said at least one passageway, and which is sufficiently elongated in longitudinal cross section at least along a portion of its periphery so as to be capable of flexing with respect to an axis of projection to allow each ridge to flex along a substantial portion to accommodate a cable portion in an expected range of cable diameters and form a radial seal about the cable portion; and
- said at least one passageway having a slit associated therewith and extending between said end faces in a direction parallel to a longitudinal axis of said at least one passageway and between an outer surface of said body and said at least one passageway and said grommet including provisions for causing at least portions of each ridge which face each other across the slit to remain overlapped not withstanding the application of forces which cause relative longitudinal motion of portions of said body on opposite sides of the slit to an extent which would compromise the sealing capability of said grommet.

16. The grommet of claim 14, wherein said peripheral means includes a plurality of longitudinally spaced circumferential ribs formed on an outer surface portion of said grommet, each said rib providing a seal with a wall which defines an opening in which said grommet is disposed.

17. The grommet of claim 14, wherein each said slit is formed in a zigzag path across the body of the grommet.

18. A grommet which is capable of providing sealed engagement with an elongated member extending therethrough, said grommet comprising:
- a unipartite body having inner and outer end faces which are spaced apart and having at least one elongated member receiving passageway which extends through said body from said inner end face to said outer end face, said at least one passageway being defined by an interior sidewall having a diameter which is larger than that of an elongated member a portion of which is expected to extend through said at least one passageway and having a longitudinal axis extending between said inner and outer end faces; and
- a plurality of longitudinally spaced circumferential ridges associated with said at least one passageway, each ridge extending inwardly from said interior sidewall of said at least one passageway and defining an opening having a diameter which is normally smaller than that of an elongated member a portion of which is expected to be inserted into said at least one passageway and which is sufficiently elongated in longitudinal cross section at least along a portion of its periphery so as to be capable of flexing with respect to an axis of projection to allow each ridge to flex along a substantial portion to accommodate a portion of an elongated member in an expected range of elongated member diameters and form a seal about the portion of the elongated member;
- said at least one passageway having a slit associated therewith and extending in a direction parallel to a longitudinal axis of said at least one passageway between said end faces between an outer surface portion of said body and said at least one passageway and wherein said grommet including provisions for causing at least portions of each ridge which face each other across a slit to remain overlapped sufficiently notwithstanding the application of forces which cause relative longitudinal motion of portions of said body on opposite sides of the slit to an extent which would compromise the sealing capability of said grommet.

19. The grommet of claim 18, wherein said grommet includes provisions for causing the portions of said ridges across said slit to overlap in a direction parallel to the longitudinal axis of the associated passageway when said grommet is subjected to forces which cause portions of said grommet adjacent to the slit to become offset with respect to each other.

20. The closure of claim 19, wherein stub-like portions of each said ridge adjacent to each said slit have a width as measured in a direction parallel to the longitudinal axis of the associated passageway which is greater than that of the remaining portion of said each ridge and which is sufficient so that adjacent portions of the ridges on opposite sides of each slit have at least portions thereof which overlap for expected offsets.

21. A grommet which is capable of providing sealed engagement with an elongated member extending therethrough, said grommet comprising:
- a unipartite body having inner and outer end faces which are spaced apart and having at least two elongated member receiving passageways which extend through said body from said inner end face to said outer end face, each said passsageway being defined by an interior sidewall having a diameter which is larger than that of an elongated member portion of which is expected to extend through said each passageway and having a longitudinal axis extending between said inner and outer end faces; and
- a plurality of longitudinally spaced circumferential ridges associated with each said passageway, each ridge extending inwardly from said interior sidewall of the associated passageway and defining an opening having a diameter which is normally smaller than that of an elongated member a portion of which is expected to be inserted into said associated passageway, and where for a substantial portion of its circumference, each ridge has an axis of projection which forms an oblique angle with respect to the longitudinal axis of the associated passageway and is sufficiently elongated in longitudinal cross section so as to be capable of flexing with respect to the axis of projection to allow each ridge to flex along the substantial portion to accommodate a portion of an elongated member in an expected range of diameters and form a seal about the elongated member portion;
- each said passageway having a slit associated therewith and extending between said end faces in a direction parallel to a longitudinal axis of said associated passageway between an outer surface of said body and said each passageway and wherein each ridge in the slitted passageway varies in projecting length to become stub-like in the vicinity of the slit and substantial incapable of flexing, said grommet including provisions for causing at least portions of each ridge which face each other across a slit to remain overlapped notwithstanding the application of forces which cause relative longitudinal motion of portions of said body on opposite sides of the slit to an extent which would compromise the sealing capability of said grommet.

22. The grommet of claim 21, wherein said grommet includes provisions for causing the portions of said ridges across each said slit to overlap in a direction parallel to the longitudinal axis of the associated passageway when said grommet is subjected to forces which cause portions of said body adjacent to each said slit to become offset with respect to each other.

23. The grommet of claim 22, wherein said stub-like portions of said ridges adjacent to said slits each have a width as measured in a direction parallel to the longitudinal axes of the passageways which is greater than that of the remaining portions of the ridges and which is sufficient so that adjacent portions of the ridges on opposite sides of each slit have at least portions thereof which overlap for expected offsets.

24. The grommet of claim 23, wherein an outer portion of said grommet is provided with a plurality of outwardly projecting peripherally disposed ribs which are adapted to engage a surface which defines an opening in which said grommet is disposed to provide a seal against the ingress of moisture.

25. The grommet of claim 24, wherein said grommet includes provisions for causing the portions of said ribs across each said slit to overlap in a direction parallel to the longitudinal axes of the passageways when said grommet is subjected to forces which cause portions of said grommet adjacent to said slits to become offset with respect to each other.

26. The grommet of claim 25, wherein portions of said ribs adjacent to said slits have a width as measured in a direction parallel to the longitudinal axes of the passageways which is greater than that of the remaining portions of the ribs and which is sufficient so that adjacent portions of the ribs on opposite sides of each slit have at least portions thereof which overlap for expected offsets.

* * * * *